United States Patent [19]

Park

[11] Patent Number: 5,225,899
[45] Date of Patent: Jul. 6, 1993

[54] CORRELATION ADAPTIVE LUMINANCE AND CHROMINANCE SIGNAL SEPARATING CIRCUIT

[75] Inventor: Young-jun Park, Suwon, Rep. of Korea

[73] Assignee: Samsung Electronics Co., Ltd., Suwon, Rep. of Korea

[21] Appl. No.: 715,602

[22] Filed: Jun. 14, 1991

[30] Foreign Application Priority Data

Jun. 29, 1990 [KR] Rep. of Korea .................. 90-9722

[51] Int. Cl.$^5$ ............................................. H04N 9/78
[52] U.S. Cl. ........................................... 358/31
[58] Field of Search ............................. 358/31, 39

[56] References Cited

U.S. PATENT DOCUMENTS

| | | | |
|---|---|---|---|
| 4,688,080 | 8/1987 | Wagner | 358/31 |
| 4,819,062 | 4/1989 | Dongil | 358/31 |
| 4,979,023 | 12/1990 | Tsinberg | 358/31 |
| 4,994,906 | 2/1991 | Moriwake | 358/31 |

Primary Examiner—Tommy P. Chin
Attorney, Agent, or Firm—Robert E. Bushnell

[57] ABSTRACT

A correlation adaptive luminance and chrominance separating circuit includes: a line comb-filtering circuit for comb-filtering the input composite video signal; a vertical correlation adaptive circuit for detecting each vertical correlation from the comb-data outputted from the line comb-filtering circuit and selecting one of the comb-data according to the detected vertical correlation; a horizontal band pass filter circuit for inversely and reinversely delaying the video signal supplied from the vertical correlation adaptive circuit and producing the chrominance signal data and the vertical correlation data from the video signals; a horizontal correlation adaptive circuit for detecting a horizontal correlation from the horizontal correlation data and selecting one of the chrominance signal data according to the detected horizontal correlation; and a luminance and chrominance signal output portion for receiving the video signal and chrominance signal supplied from the line comb-filtering circuit and a horizontal correlation adaptive circuit, respectively, to output the finally separated luminance signal and chrominance signal. The circuit prevents the hanging dot and dot crawl, improving the image quality.

17 Claims, 8 Drawing Sheets

CORRELATION ADAPTIVE LUMINANCE AND CHROMINANCE SIGNAL SEPARATING CIRCUIT

BACKGROUND OF THE INVENTION

The present invention relates to a circuit for separating a composite video signal into a luminance signal and a chrominance signal in a color television, and more particularly to a correlation adaptive luminance/chrominance signal separating circuit which detects vertical and horizontal correlation with respect to an arbitrary reference composite video signal in a received digital composite video signal and adaptively separates the luminance signal and the chrominance signal according to the correlations.

It is generally known that the human eye distinguish chrominance data such as hue, saturation, etc., with great detail, unlike luminance data. Thus, most television video signals assign luminance data a wide band (4.2 MHz in the NTSC type) as shown in FIG. 1A. In contrast, the resolution for hue and saturation only requires 1/10 to ⅓ bandwidth of the brightness.

According to the aforementioned characteristic, the chrominance signals have a much narrower bandwidth than the luminance signal. For instance, as shown in FIG. 1B, an I signal component of the chrominance signal has a band of 1.3 MHz, and a Q signal component has a band of 0.5 MHz, respectively. Also, in the NTSC type, the chrominance subcarrier has the frequency of 3.579545 MHz, i.e., 227.5 $f_H$ and the sideband of the chrominance signal is interleaved with the high frequency sideband of the luminance signal as shown in FIG. 1C.

When the composite video signal having the spectrum such as FIG. 1C is displayed, dots which continuously exist in an arbitrary scan line are interleaved to the dots of the next line. Thus, even in a black-and-white television receiver, the picture looks normal in the proper watching distance. This is why the NTSC type is compatibly used with the black-and-white television broadcasting type. And in the NTSC color television receiver, a luminance channel is formed by removing a chrominance signal from a composite video signal in which the luminance signal and the chrominance signal are interleaved as shown in FIG. 1D, and a chrominance channel is formed by demodulating the chrominance signal to produce a chrominance difference signal, so that the color television image can be watched.

In a conventional luminance/chrominance signal separating method adapted to a color television receiver, a band reject filter in which a luminance signal is attenuated by about 3 dB between 2.3 MHz and 2.8 MHz and is completely attenuated at 3.58 MHz, as shown in FIG. 1E, and a band pass filter (hereinafter, referred to as BPF) having the center of 3.58 MHz, as shown in FIG. 1F are installed. However, as the result, the resolution of the luminance signal is deteriorated. For instance, the transition of the luminance signal having a rising time of 150 ns is increased to 250 ns through 300 ns. Also, the high frequency component of the luminance signal is wrongly filtered together with chrominance signal in the BPF such as FIG. 1F, thereby generating a cross color phenomenon during the demodulation of the chrominance signal.

Accordingly, the attenuation of the luminance signal is generated in the luminance channel separated from the composite video signal where the luminance signal and the chrominance signal are interleaved, and a hindrance phenomenon is generated in the chrominance channel by the high frequency component of the luminance signal.

To prevent the generation of the factors causing the deterioration of the image and separate the luminance signal and the chrominance signal, a comb-filtering method has been used.

The block diagram shown in FIG. 2 represents a general comb-filter which comprises a 1H (a period of horizontal synchronizing signal; hereinafter, referred to as H) delay circuit 10, subtracters 20 and 50, a ½ amplifier 30 and a BPF 40. In the comb-filter, since chrominance signal components existing in two continuous horizontal scanning lines have the phase difference of 180° with respect to each other, the difference between two continuous horizontal scanning lines is obtained and then the luminance component is removed to obtain only the chrominance component. However, in the case of a vertical transition of the image, the luminance signal of low band (0 to approximately 2.3 MHz) is filtered with the chrominance signal, thereby reducing the vertical resolution of the luminance signal and also generating a cross color phenomenon during the demodulation of the chrominance signal. Thus, the comb-filter band-pass-filters the signal obtained from the difference between two horizontal scanning lines to separate the chrominance signal and removes this chrominance signal from the composite video signal to obtain a luminance signal.

In the comb-filter of FIG. 2, when a composite video signal V is input, it is first delayed by 1H in the 1H delay circuit 10. And the difference between the 1H delayed video signal $V_H$ and the currently input video signal V is obtained in the first subtracter 20, so that the luminance signals of the two signals are counterbalanced to each other the chrominance signals are added and then output. The ½ amplifier 30 ½-amplifies the signal outputted from the first subtracter 20 to obtain the average level of the chrominance signal. Then, the signal output from the ½ amplifier 30 is band-pass-filtered in the BPF 40 to obtain only the chrominance signal, and the second subtracter 50 subtracts the chrominance signal outputted from the BPF 40 from the currently input video signal V, so that the luminance signal is obtained.

However, in the comb-filter, a hanging dot phenomenon is generated by the vertical transition of the chrominance signal and the dot crawl phenomenon in the luminance channel is generated by the chrominance signal mixed in the luminance signal Y in the band pass filtering step. Accordingly, several methods are suggested to prevent the deterioration of an image and a well-known method among them is a correlation adaptive comb-filtering method.

FIG. 3 illustrates one of the conventional correlation adaptive luminance/chrominance signal separation circuits which includes first and second 1H delay circuits 60 and 70, subtracters 80 and 90, first and second ½ amplifiers 100 and 110, first and second LPFs 120 and 130, a comparator 140 and a data selector 150. The circuit of FIG. 3 detects each vertical correlation between adjacent horizontal scanning lines among three continuous horizontal scanning lines to comb-filter the composite video signal having the larger correlation. In the circuit of FIG. 3, the currently input video signal V is delayed by 1H in the first 1H delay circuit 60 and the 1H delayed video signal $V_H$ is again delayed by 1H in the second 1H delay circuit 70.

And the third subtracter 80 subtracts the 1H delayed video signal $V_H$ from the currently input video signal V and the fourth subtracter 90 subtracts the 2H delayed video signal $V_{H\ H}$ from the 1 H delayed video signal $V_H$. The signals output from the third and fourth subtracters are respectively ½-amplified in the first and second ½ amplifiers 100 and 110 to be supplied to the input terminals of the data selector 150. That is, two chrominance signals obtained by respectively comb-filtering the currently input video signal V and the 2H delayed video signal $V_{H\ H}$ with respect to the 1H delayed video signal $V_H$ among three continuous horizontal scanning lines are respectively supplied to input terminals of the data selector 150. Also, the first and second LPFs 120 and 130 low-pass-filter signals output from the third and fourth subtracters 80 and 90 to remove the chrominance signal component and supply the signals to input terminals of the comparator. 140, respectively. The comparator 140 compares the magnitude of the data input in the two input terminals A and B, and if the data inputted in the terminal A is larger than the data input in the terminals B, the magnitude comparator outputs the logic "1", and if not, it outputs the logic "0".

Also, when there is no vertical transition between adjacent horizontal scanning lines in three continuous horizontal scanning lines, "0" is output from the first and second LPFs 120 and 130, and when there is a vertical transition, the luminance components which are not counterbalanced each other are output from the third and fourth subtracters 80 and 90. Then, when the output signal of the first LPF 120 is greater than the output signal of the second LPF 130, the comparator 140 outputs the logic "0", and accordingly, the data selector 150 selects the signal output from the second ½ amplifier 110 and outputs it through the output terminal Z. Then, the chrominance signal output from the data selector 150 is band-pass-filtered by the BPF as shown in FIG. 1 to obtain the separated chrominance signal and the luminance signal is separated using this chrominance signal. As a result, the two horizontal scanning lines having the relatively large vertical correlation are comb-filtered, thereby preventing the hanging dot phenomenon. The circuit of FIG. 3 can prevent the hanging dot phenomenon, but still generates the dot crawl phenomenon.

SUMMARY OF THE INVENTION

Accordingly, it is an object of the present invention to provide a correlation adaptive luminance/chrominance signal separating circuit, in a circuit for separating the luminance signal and chrominance signal from the composite video signal used in the color television, wherein not only the vertical correlation of three continuous horizontal scanning lines but also the horizontal correlation thereof are detected to adaptively comb-filter the composite video signal according to the vertical correlation and then to be adaptively band-pass-filtered according to the horizontal correlation, thereby separating the luminance signal and chrominance signal from the composite video signal to prevent the hanging dot phenomenon and the dot crawl phenomenon.

BRIEF DESCRIPTION OF THE DRAWINGS

The above object and other advantages of the present invention will become more apparent by describing the preferred embodiment of the present invention with reference to the attached drawings, in which.

DETAILED DESCRIPTION OF THE INVENTION

Figure 1A:
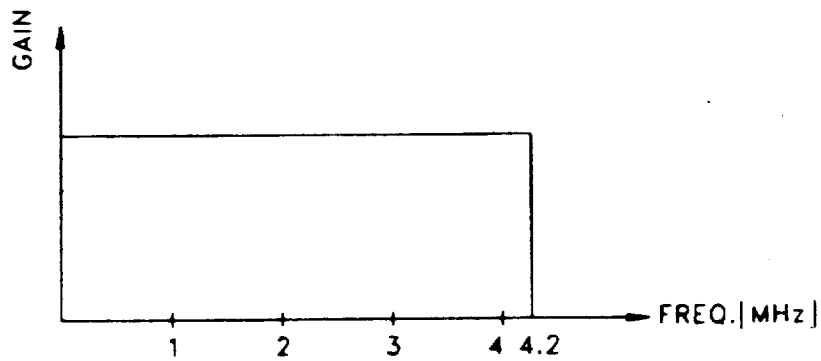
FIGS. 1A through 1F illustrate frequency spectrums of composite video signals of NTSC type television.
Figure 1B:
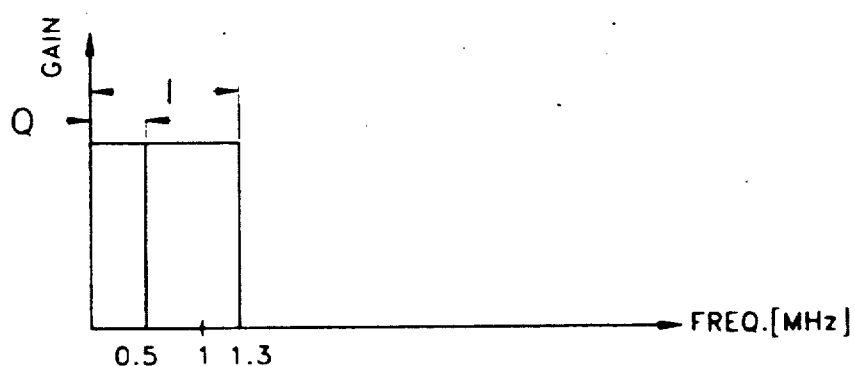
Figure 1C:
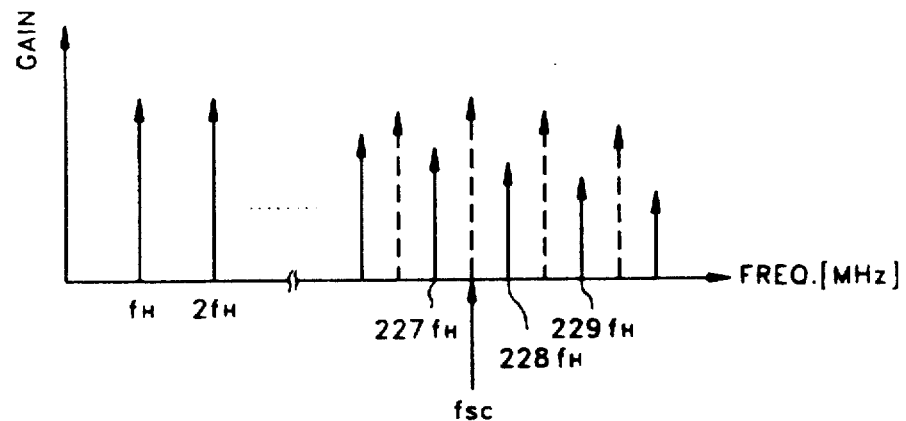
Figure 1D:
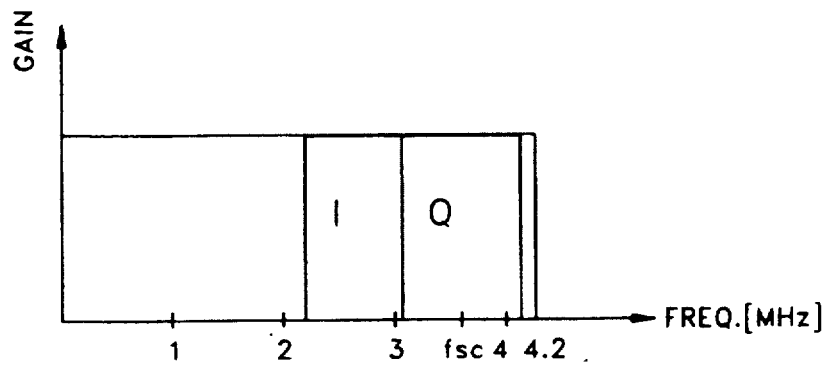
Figure 1E:
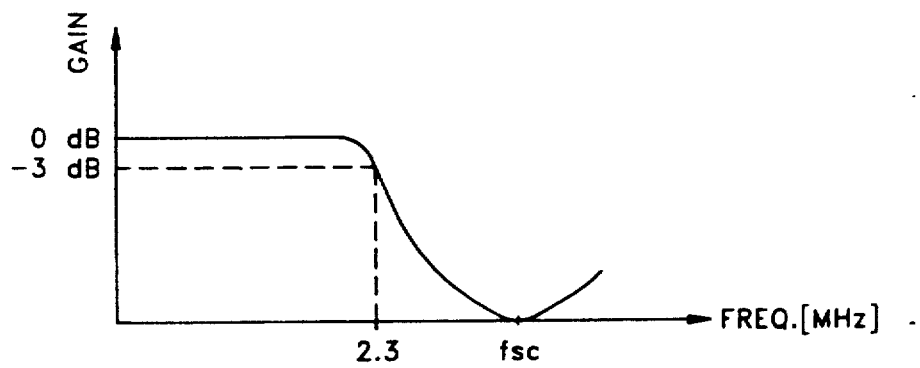
Figure 1F:
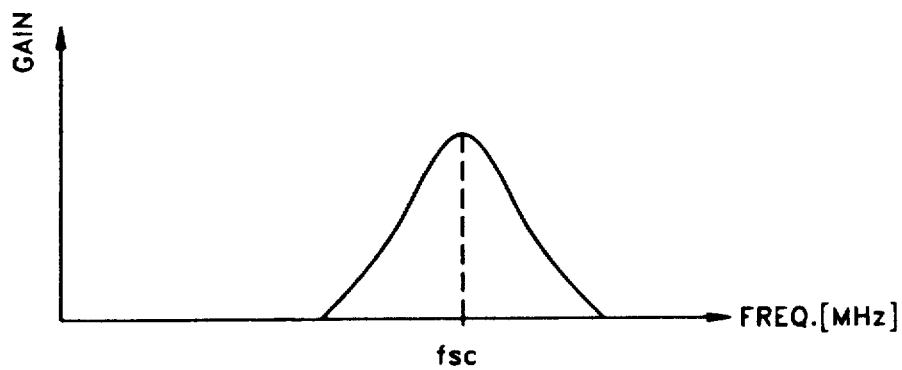
Figure 2:
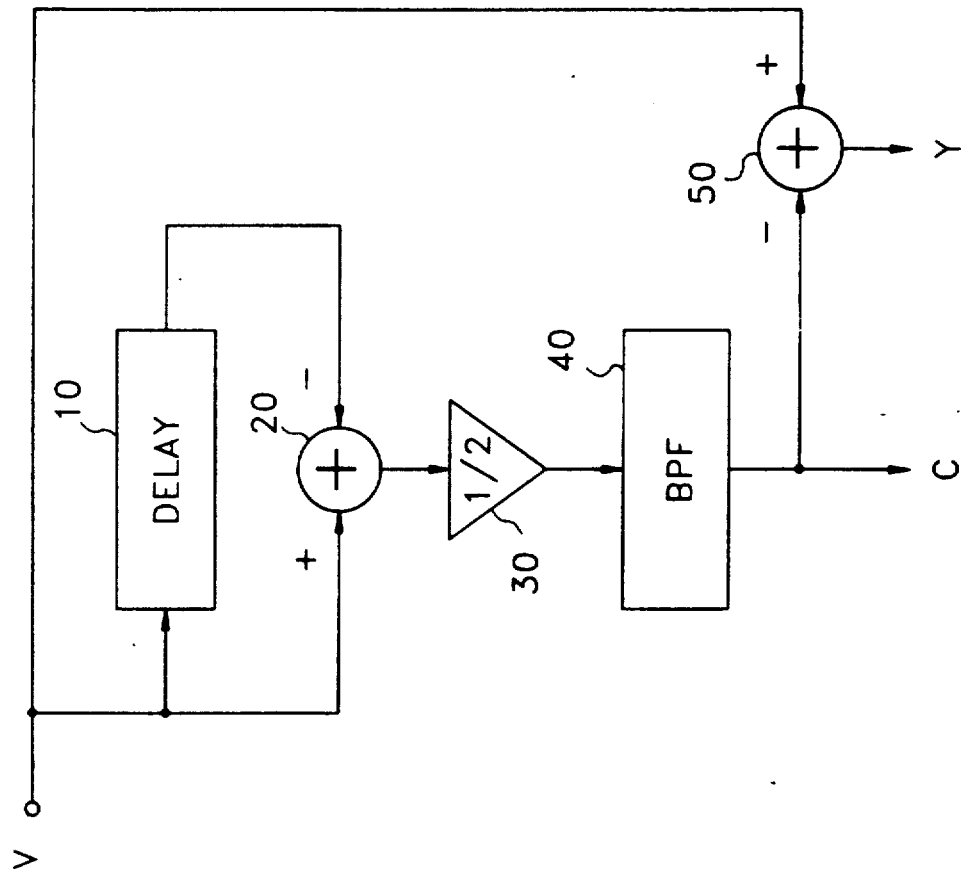
FIG. 2 is a block diagram of a conventional comb-filter.
Figure 3:
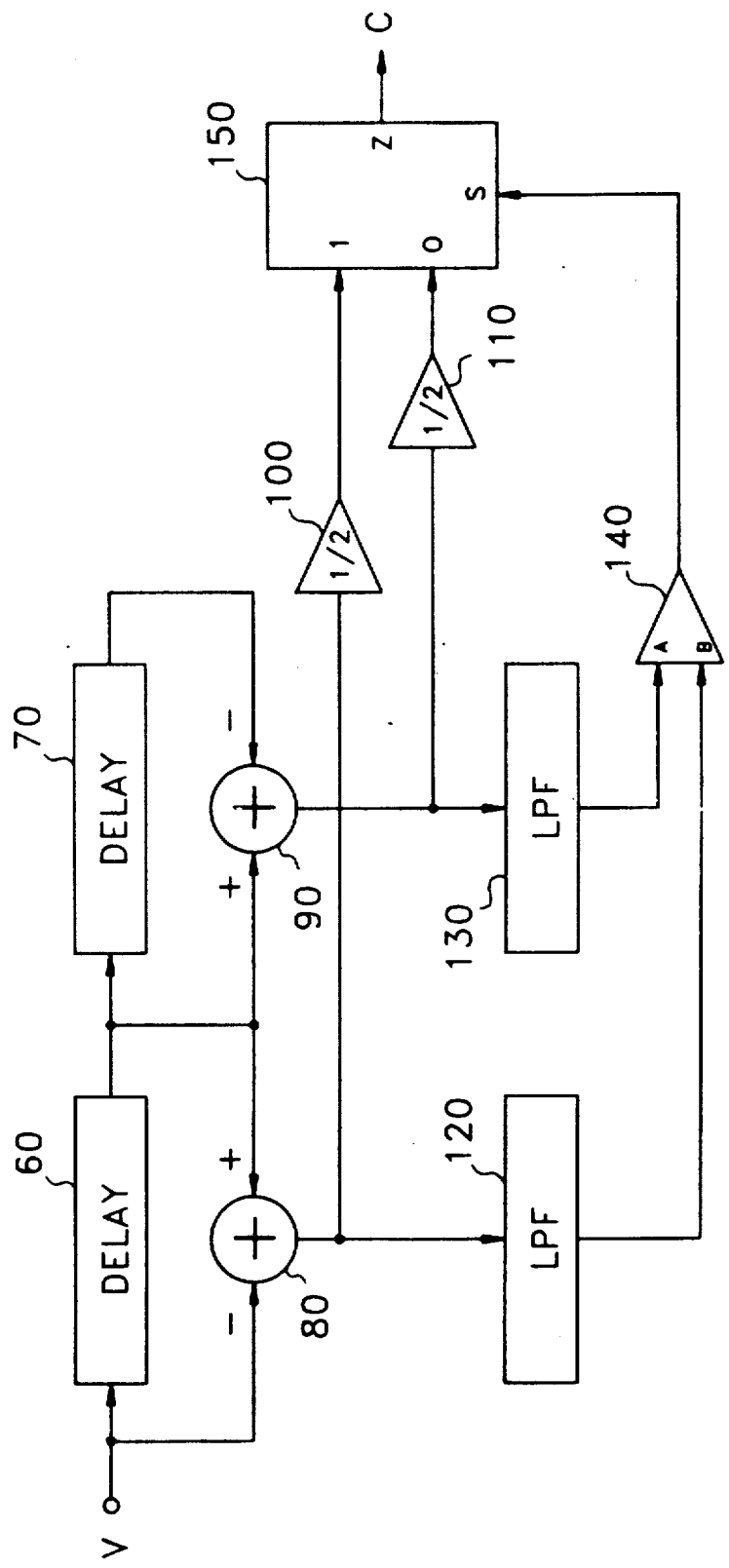
FIG. 3 is a block diagram of a conventional correlation adaptive luminance and chrominance signal separating circuit.
Figure 4:
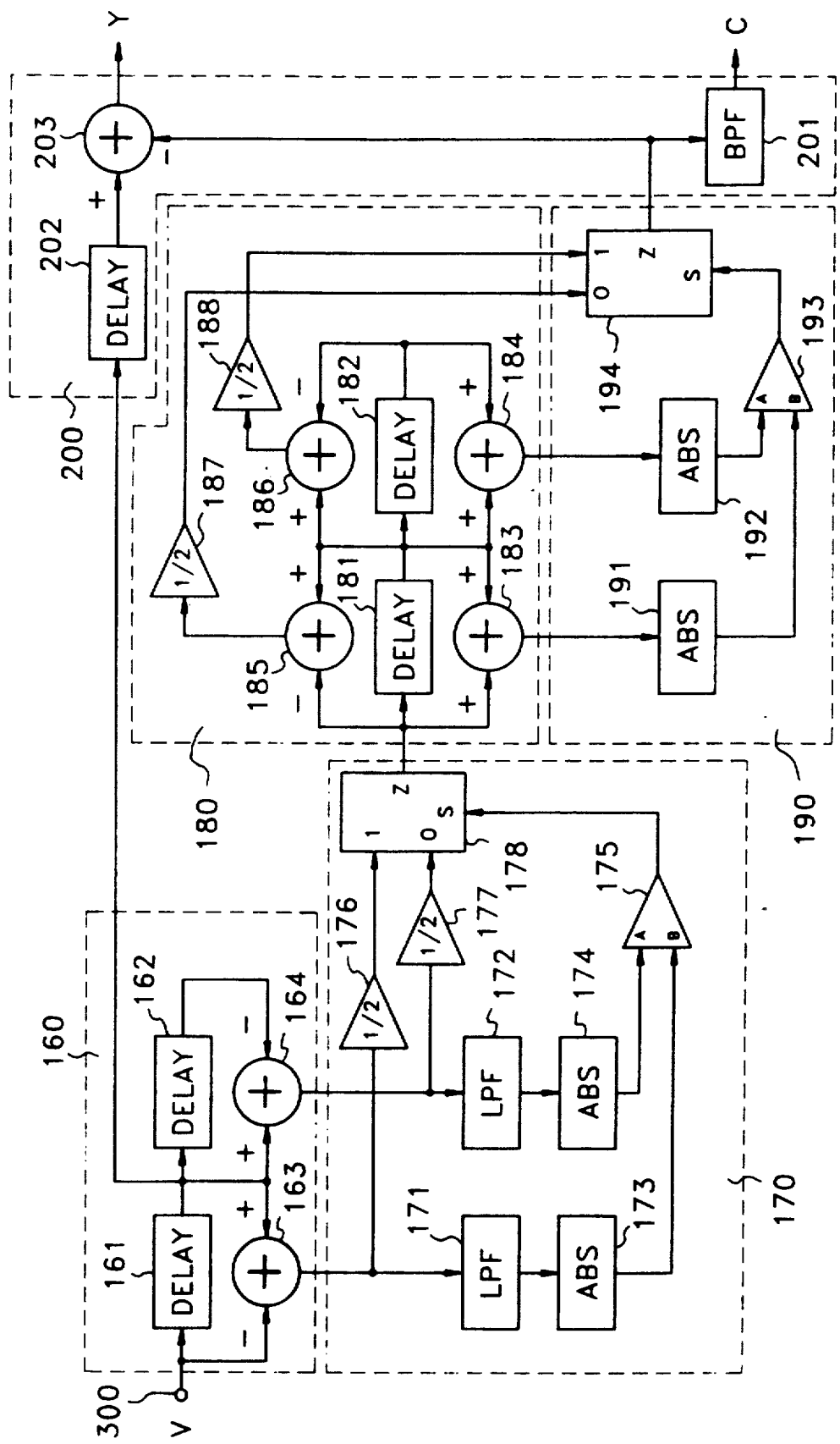
FIG. 4 is a block diagram of a correlation adaptive luminance and chrominance signal separating circuit according to the present invention.

FIG. 4 illustrates a correlation adaptive luminance/chrominance signal separating circuit according to the present invention, which includes a line comb-filtering circuit 160 for respectively comb-filtering a currently input video signal V and a 2H delayed video signal $V_{H\ H}$ with respect to a 1H delayed video signal $V_H$ by delaying the currently input video signal V input through a video signal input terminal 300 by 1H and 2H, to output the resultant first and second comb data; a vertical correlation adaptive circuit 170 connected to output terminals of the line comb-filtering circuit 160 for low-pass-filtering the first and second comb-data and comparing the absolute values to detect the vertical correlation and selecting and outputting the first or the second comb-data according to the detected vertical correlation; a horizontal band pass filter circuit 180 connected to the output terminal of the vertical correlation adaptive circuit 170 for outputting the first and second chrominance signal data obtained by respectively subtracting the output signal of the first data selector 178 and the reinversely delayed video signal from the inverse delayed video signal among three continuous horizontal video signals obtained by delaying the first or the second comb-data to invert and reinvert the phase of the chrominance subcarrier and, at the same time, outputting the first and second horizontal correlation data obtained by respectively adding the video signal output from the first data selector 178 and the reinversely delayed video signal into the inversely delayed video signal; a horizontal correlation adaptive circuit 190 connected to an output terminal of the horizontal band pass filter circuit 180 for comparing absolute values of the first and second horizontal correlation data to detect a horizontal correlation and selecting and outputting the first or the second chrominance signal data according to the detected horizontal correlation; and a luminance and chrominance signal output portion 200 connected to the output terminal of the line comb-filtering circuit 160 and the output terminal of the horizontal correlation adaptive circuit 190 for band-pass-filtering the first or the second chrominance signal data which is adaptively selected according to the vertical and horizontal correlations, to output a chrominance signal C and subtracting a chrominance signal output from the second data selector 194 from a predetermined delayed video signal via the fifth delay 202, to output a luminance signal Y.

In the circuit of FIG. 4, the line comb-filtering circuit 160 includes: a first 1H delay circuit 161 for delaying a currently input video signal by a 1H to output the delayed signal; a second 1H delay circuit 162 connected to an output terminal of the first 1H delay circuit 161 for delaying the 1H delayed video signal $V_H$ again to output a 2H delayed video signal $V_{HH}$; a third subtractor 163 connected in parallel to the first 1H delay circuit 161 for subtracting a currently inputted video signal V from the 1H delayed video signal $V_H$ to output a first comb-data; and a fourth subtracter 164 connected in parallel to the second 1H delay circuit 162 for subtracting a 2H delayed video signal $V_{HH}$ from the 1H delayed video signal $V_H$ to output a second comb-data.

The certical correlation adaptive circuit 170 includes: first and second ½ amplifiers 176 and 177 connected to output terminals of the third and fourth subtracters 163 and 164, respectively, to ½-amplify the first and second comb-data, respectively; first and second LPFs 171 and 172 connected to output terminals of the third and fourth subtracters 163 and 164 for low-pass-filtering the first and second comb-data to output the low-pass-filtered data; first and second absolute value circuits 173 and 174 connected to output terminals of the first and second LPFs 171 and 172, respectively, for obtaining the absolute values of the signals outputted from the first and second LPFs and outputting the absolute values; a first comparator 175 connected to output terminals of the first and second absolute value circuits 173 and 174 for comparing output signals of the first and second absolute value circuits to output a first selection data of a predetermined logic; and a first data selector 178 connected to the output terminal of the first and second ½ amplifiers 176 and 177 and the output terminal of the first comparator 175, respectively, to select and output the first or the second comb-data according to the first selection data.

The horizontal band pass filter circuit 180 includes a third delay circuit 181 connected to the output terminal Z of the first data selector 178 for delaying the first or the second comb-data to invert the phase of the chrominance subcarrier and outputting the delayed comb-data; a fourth delay circuit 182 connected to the output terminal of the third delay circuit 181 for inversely delaying again the inversely delayed video signal to output a reinversed video signal; fifth and sixth subtracters 185 and 186 connected in parallel to the third and fourth delay circuits 181 and 182, respectively, for outputting first and second chrominance signal data obtained by respectively subtracting the output signal of the first data selector 178 and the reinversely delayed video signal from the inversely delayed video signal; third and fourth ½ amplifiers 187 and 188 connected to output terminals of the fifth and sixth subtracters 185 and 186, respectively, for ½-amplifying the first and second chrominance signal data; and first and second adders 183 and 184 connected in parallel to the third and fourth delay circuits 181 and 182, respectively, for outputting the first and second horizontal correlation data obtained by adding the output signal of the first data selector 178 and the reinversely delayed video signal into the inversely delayed video signal, respectively.

The horizontal correlation adaptive circuit 190 includes: third and fourth absolute value circuits 191 and 192 connected to output terminals of the first and second adders 183 and 184, respectively, for obtaining the absolute values of the first and second horizontal correlation data and outputting the absolute values, respectively; a second comparator 193 connected to output terminals of the third and fourth absolute value circuits 191 and 192, respectively, for comparing the absolute values of the first and second horizontal correlation data outputted from the third and fourth absolute value circuits, to output a second selection data of a predetermined logic; and a second data selector 194 connected to output terminals of the third and fourth ½ amplifiers 187 and 188 and an output terminal of the second comparator 193, to select and output the first or second chrominance signal data according to the second selection data.

The luminance/chrominance signal output portion 200 comprises: a BPF 201 connected to an output terminal of the data selector 194 for band-pass-filtering the first or the second chrominance signal data to output the chrominance signal C; a fifth delay circuit 202 for compensating the delay of the circuit by delaying the 1H delayed video signal $V_H$ output from the first delay circuit 161 by the predetermined value; and the seventh subtracter 203 connected to an output terminal of the fifth delay circuit 202 and an output terminal of the second data selector 194, respectively, for subtracting a chrominance signal output from the second data selector 194 from a video signal output from the fifth delay circuit 202 to output a luminance signal Y.

Figure 5A:
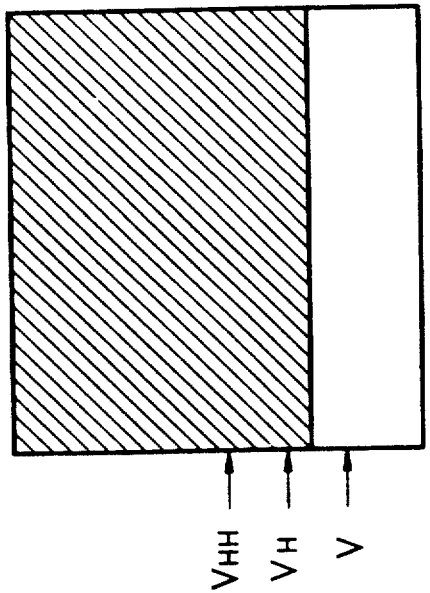
FIGS. 5A and 5B are views showing an example of the vertical and horizontal transitions.
Figure 5B:
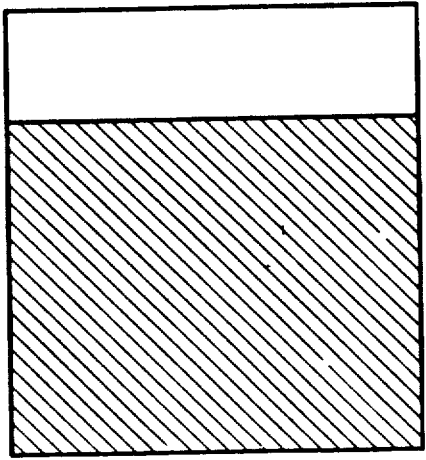

FIG. 5A shows the vertical transition of an image and FIG. 5B shows the horizontal transition of an image.

FIG. 5A shows the generation of the vertical transition of an image, in which the 2H delayed video signal $V_H$ and the 1H delayed video signal $V_H$ are video signals having a constant luminance and the input video signal V is a colorless white video signal.

FIG. 5B shows the horizontal transition of an image from an image having a predetermined color and luminance to a colorless white image.

Figure 6A:
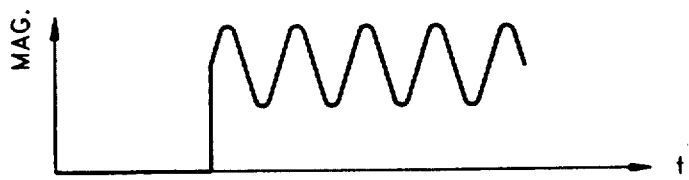
FIGS. 6A through 6R are waveform graphs showing the operations at several parts of the correlation adaptive luminance and chrominance signal separating circuit of FIG. 4.
Figure 6B:
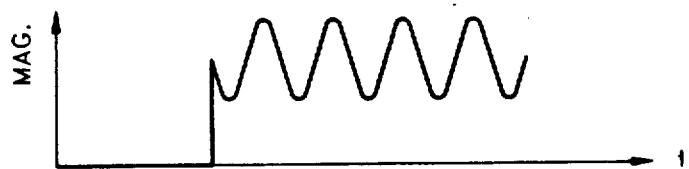
Figure 6C:
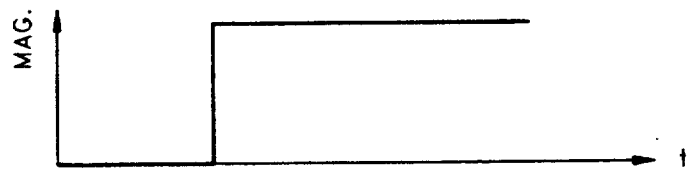
Figure 6D:
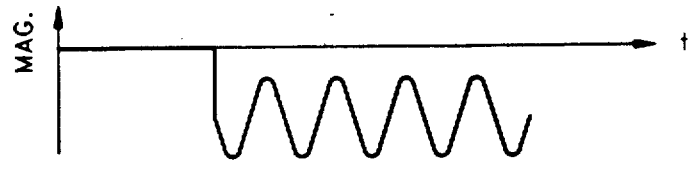
Figure 6E:
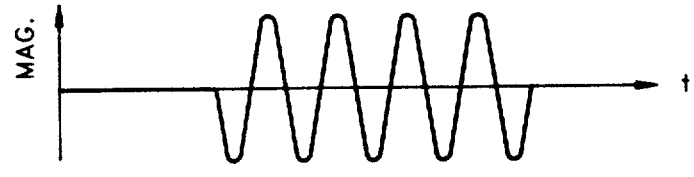
Figure 6F:
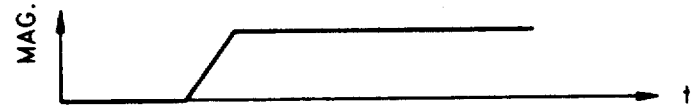
Figure 6G:
Figure 6H:
Figure 6J:
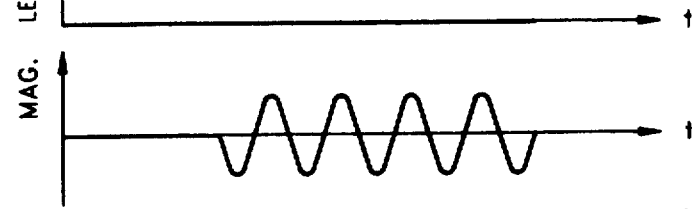
Figure 6K:
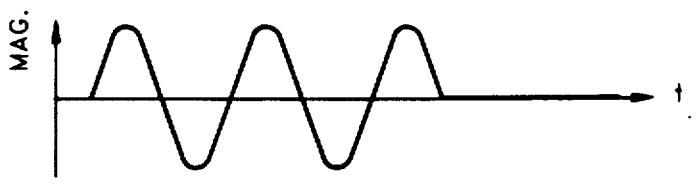
Figure 6L:
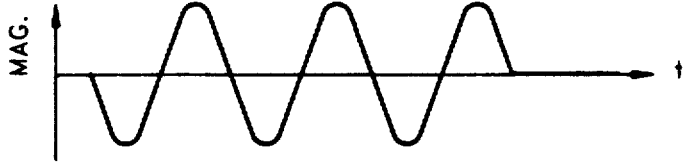
Figure 6M:
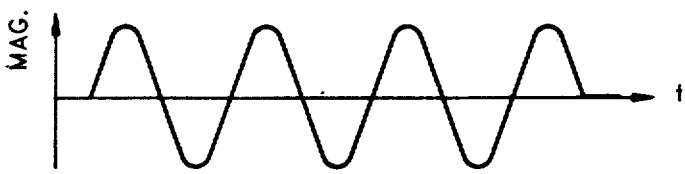
Figure 6N:
Figure 6P:
Figure 6Q:
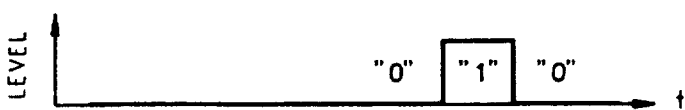
Figure 6R:
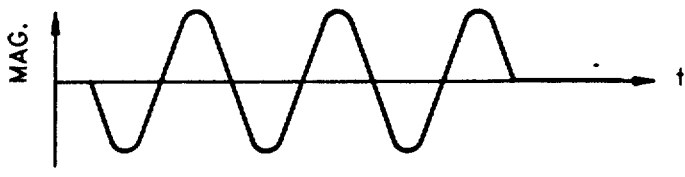

FIGS. 6A through 6R are waveform graphs at several parts of the circuit of FIG. 4, and show the operations when the vertical and horizontal transitions are generated in the input video signal V as in FIGS. 5A and 5B.

The operation of the embodiment of the present invention shown in FIG. 4 will be described in detail with reference to FIGS. 5A, 5B and 6A through 6P.

When a composite video signal converted into a digital signal by a sampling clock having a frequency 4 fsc four times as large as the chrominance subcarrier frequency fsc, is input through an input terminal 300, the currently input video signal V is delayed by 1H by a first delay circuit 161 and the 1H delayed video signal $V_H$ is again delayed by 1H by a second delay circuit 162 to be a 2H delayed video signal $V_{HH}$. At this time, if an image has a vertical transition as shown in FIG. 5A, the waveforms of the three continuous horizontal scanning lines, i.e., the 2H delayed video signal $V_{HH}$, the 1H delayed video signal $V_H$, and the currently inputted video signal become as shown in FIGS. 6A through 6C. And the third subtracter 163 subtracts the currently input video signal V as shown in FIG. 6C from the 1H delayed video signal $V_H$ as shown in FIG. 6B to output such a first comb-data as shown in FIG. 6D. The fourth subtracter 164 subtracts the 2H delayed video signal $V_{HH}$ from the 1H delayed video signal $V_H$ to output such a second comb-data as shown in FIG. 6E. That is, the video signals which are vertically adjacent to the 1H delayed video signal $V_H$ are respectively comb-filtered. If there is no vertical transition, the third and fourth subtracters 163 and 164 output only chrominance signals.

The first and second comb-data are respectively ½-amplified in the first and second ½ amplifiers 176 and 177 to be input to two input terminals of the data selector 178. At this time, the first and second ½ amplifiers 176 and 177 have an amplification rate of ½. Also, the first and second comb-data are low-pass-filtered in the first and second LPFs 171 and 172, and thus the chrominance subcarrier frequency component, i.e., a modulated chrominance signal component is removed. And the comb-data without chrominance subcarrier are supplied to the first and second absolute value circuits 173 and 174, respectively. At this time, in the first and second LPFs 171 and 172, when there is no vertical transition of the video signal, "0" is output, and when there is a vertical transition, the difference component of the luminance signals is output. Since a vertical transition is generated between the 1H delayed video signal V$_H$ and the currently input video signal V as shown in FIG. 5A, "0" is output from the second LPF 172 and the difference component of the luminance signals is output from the first LPF 171. The output signals of the first and second LPFs 171 and 172 are converted into absolute values in the first and second absolute value circuits 173 and 174, respectively. Accordingly, as shown in FIG. 6F, the difference component between the luminance signals of the currently input video signal V and the 1H delayed video signal V$_H$ is output from the first absolute value circuit 173, and as shown in FIG. 6G, "0" value is output from the second absolute value circuit 174. Then, the first comparator 175 compares the magnitudes of the signal input to the terminal B as shown in FIG. 6F with the signal inputted to the terminal A as shown in FIG. 6G. Since the magnitude of the signal inputted in the terminal A is larger than the signal input in the terminal B, the first comparator 175 outputs the first selection data of logic "0" as shown in FIG. 6H.

Accordingly, the first data selector 178 selects the ½-amplified second comb-data as shown in FIG. 6J among the first comb-data and second comb-data and outputs the selected data through the output terminal Z. That is, the comb-data which has no vertical transition is selected and output. Thus, the comb-filtering is carried out to output a comb-data having no vertical transition of image, i.e., a comb-data having a high vertical correlation, thereby preventing the generation of the hanging dot phenomenon. However, in the signal adaptively comb-filtered according to the vertical correlation as described above, the oblique line component and the vertical transition component remain, and the conventional luminance and chrominance signal separating circuit uses the BPF for reducing the effect of the oblique line component and the vertical transition component of the luminance signal, thereby generating the dot crawl phenomenon.

The second comb-data selectively output according to the vertical correlation as described above is delayed by the third delay circuit 181 to change the phase of the chrominance subcarrier by 180°. At this time, since the currently input video signal V is sampled to the frequency 4 fsc four times as large as the chrominance subcarrier frequency fsc, the third delay circuit 181 delays the second comb-data by two clocks. And the second comb-data delayed by two clocks is again delayed by two clocks by the fourth delay circuit 182. When an image is horizontally transited as shown in FIG. 5B, the second comb-data inputted in the third delay 181 has the waveform as shown in FIG. 6M, and the second comb-data delayed by two clocks outputted from the third delay device 181 has the waveform as shown in FIG. 6L, and the second comb-data delayed by four clocks output from the fourth delay device 182 has the waveform as shown in FIG. 6K. The fifth subtracter 185 subtracts the currently inputted second comb-data from the two-clock delayed second comb-data to output the difference signal, and the sixth subtracter 186 subtracts the four-clock delayed second comb-data from the two-clock delayed second comb-data to output the difference signal.

The first and second chrominance signal data output from the fifth and sixth subtracters 185 and 186 are ½-amplified in the third and fourth ½ amplifiers 187 and 188 to be supplied to two input terminals of the second data selector 194, respectively. Also, the first adder 183 adds the two-clock delayed second comb-data and the currently input second comb-data, and supplies the obtained first horizontal correlation data to the third absolute value circuit 191, and the second adder 184 adds the two-clock delayed second comb-data and the four-clock delayed second comb-data, and supplies the obtained second horizontal correlation data to the fourth absolute value circuit 192. The third and fourth absolute value circuits 191 and 192 obtain the absolute values of the first and second horizontal correlation data to output the signals of the waveforms as shown in FIGS. 6N and 6P.

Then, the second comparator 193 compares the absolute values of the first and second horizontal correlation data input to two input terminals. When the absolute value of the second horizontal correlation data input in the terminal A is greater than the absolute value of the first horizontal correlation data inputted in the terminal B, the second selection data of logic "1" as shown in FIG. 6Q is output to the second data selection data of the logic "0" is cases, the second selection data of the logic "0" is output. Accordingly, the second data selector 194 selects and outputs the second chrominance signal data when the second selection data of the logic "1" is input to the selection terminal S, and the first chrominance signal data when the second selection data of the logic "0" is input. Here, the output of the second data selector 194 becomes as shown in FIG. 6R.

Figure 7A:
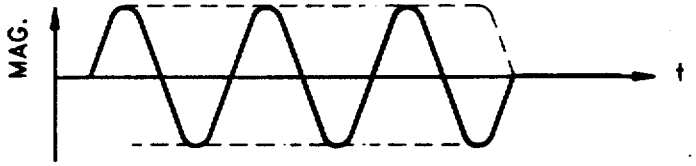
FIGS. 7A and 7B illustrate the loss of the chrominance signal in the conventional BPF.
Figure 7B:
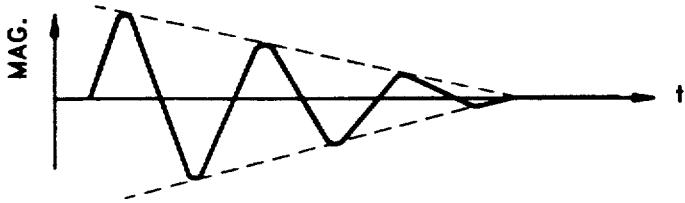

Generally, when the comb-filtered signal as shown in FIG. 7A is filtered using the conventional BPF, the chrominance signal is lost as shown in FIG. 7B, and in contrast, the chrominance signal of FIG. 6R is hardly lost. The output of the signal having no horizontal transition of the color among the output signals of the third and fourth absolute value circuits 191 and 192 becomes "0" and the signal having a horizontal transition has the difference component of the horizontal transition. Then, the second data selector 194 selects and outputs the chrominance signal data having no difference component of the horizontal transition among the first and second chrominance signal data supplied through the ½ amplifiers.

Also, the first or the second chrominance signal data output from the second data selector 194 is band-pass-filtered through the BPF 201 and is then output. That is, to more completely remove the luminance component which might be mixed in the chrominance signal separated by the aforementioned correlation adaptive luminance/chrominance signal separating circuit, the chrominance signal C is band-pass-filtered by the BPF 201 and is then output. And the chrominance signal outputted from the second selection data 194 is subtracted from the video signal output from the fifth delay device 202 for compensating the signal delay, thereby outputting the final luminance signal Y. Since the component of chrominance signal C is almost completely removed in the luminance signal Y, the hanging dot and dot crawl phenomena are not generated when the composite video signal is displayed.

In separating the luminance signal and the chrominance signal from the composite video signal, the present invention as described above has the advantages in that the vertical and horizontal correlations of the input video signal are detected and the luminance signal and the chrominance signal are adaptively comb-filtered and band-pass-filtered according to the detected vertical and horizontal correlations to separate the luminance signal and the chrominance signal, thereby preventing the hanging dot and dot crawl phenomena causing the deterioration of an image.

What is claimed is:

1. A correlation adaptive luminance and chrominance signal separting circuit comprising:
    a line comb-filtering circuit delaying input video signals by one horizontal scanning period to generate 1H delayed video signals and by two horizontal scanning periods to generate 2H delayed video signals and comb-filtering said input video signals and said 2H delayed video signals in response to said 1H delayed video signals to generate first comb-data and second-comb data, respectively;
    a vertical correlation adaptive circuit low-pass-filtering and comparing absolute values of said first comb-data and said second comb-data to detect vertical correlation, and selectively providing one of said first comb-data and said second comb-data as selected comb-data according to the detected vertical correlation;
    a horizontal band pass filter circuit generating first chrominance signal data and second chrominance signal data by providing differences between said selected comb-data and inversely delayed video signals and providing differences between said inversely delayed video signals and reinversely delayed video signals, respectively, and generating first horizontal correlation data and second horizontal correlation data by adding said selected comb-data to said inversely delayed video signals and said inversely delayed video signals to said reinversely delayed video signals, respectively, said inversely delayed video signals and said reinversely delayed video signals being generated by delaying said selected comb-data to invert and reinvert a phase of a chrominance subcarrier, respectively;
    a horizontal correlation adaptive circuit comparing absolute values of said first horizontal correlation data and said second horizontal correlation data to detect horizontal correlation and selectively providing one of said first chrominance signal data and said second chrominance signal data as selected chrominance signal data in response to the detected horizontal correlation; and
    a luminance/chrominance signal output section bandpass-filtering said selected chrominance signal data to output chrominance signals and providing differences between said selected chrominance signal data and delayed input video signals delayed by a predetermined time as luminance signals.

2. A correlation adaptive luminance and chrominance signal separating circuit as claimed in claim 1, wherein said horizontal band pass filter circuit comprises:
    a first delay circuit delaying said selected comb-data supplied from said vertical correlation adaptive circuit to invert said phase of said chrominance subcarrier of said selected comb-data to generate said inversely delayed video signals;
    a second delay circuit, connected to an output terminal of said first delay circuit, inversely delaying said inversely delayed video signals output from said first delay circuit to output said reinversely delayed video signals;
    subtracters, connected to said first delay circuit and said second delay circuit, outputting said first chrominance signal data and said second chrominance signal data obtained by subtracting said selected comb-data from said inversely delayed video signals and said reinversely delayed video signals from said inversely delayed video signals, respectively;
    half amplifiers connected to each output terminal of said subtracters for ½-amplifying said first chrominance signal data and said second chrominance signal data from said subtracters; and
    adders connected to said first delay circuit and said second delay circuit outputting said first horizontal correlation data and said second horizontal correlation data obtained by adding said selected comb-data to said inversely delayed video signals and said reinversely delayed video signals to said inversely delayed video signals, respectively.

3. A correlation adaptive luminance and chrominance signal separating circuit as claimed in claim 1, wherein said horizontal correlation adaptive circuit comprises:
    absolute value circuits obtaining said absolute values of said first horizontal correlation data and said second horizontal correlation data supplied from said horizontal band pass filter circuit;
    a comparator comparing said absolute values of said first horizontal correlation data and said second horizontal correlation data from said absolute value circuits to output selecting data; and
    a data selector providing one of said first chrominance signal data and said second chrominance signal data from each of said half amplifiers of said horizontal band pass filter circuit according to said selection data of said comparator.

4. The correlation adaptive luminance and chrominance signal separating circuit in claim 1, wherein said first comb-data and said second comb-data represent differences between said input video signals and said 1H delayed video signals and differences between said 1H delayed video signals and said 2H delayed video signals, respectively.

5. The correlation adaptive luminance and chrominance signal separating circuit in claim 1, wherein said input video signal is a digital video signal.

6. The correlation adaptive luminance and chrominance signal separating circuit in claim 5, wherein said input video signal has a sampling frequency of four times the frequency of said chrominance subcarrier.

7. The correlation adaptive luminance and chrominance signal separating circuit in claim 6, wherein said inversely delayed video signals and said reinversely delayed video signals are generated by delaying said selected comb-data two clock periods and four clock periods, respectively.

8. The correlation adaptive luminance and chrominance signal separating circuit in claim 1, wherein said delayed input video signals delayed by said predetermined time are said 1H delayed video signals.

9. A correlation adaptive luminance and chrominance signal separating circuit comprising:

line comb-filtering means for delaying input video signals by one horizontal scanning period to generate 1H delayed video signals and by two horizontal scanning periods to generate 2H delayed video signals, and for comb-filtering said input video signals and said 2H delayed video signals in response to said 1H delayed video signals to generate first comb-data and second comb-data, respectively;

vertical correlation adaptive means for low-pass-filtering and comparing absolute values of said first comb-data and said second comb-data to detect vertical correlation, and for selectively providing one of said first comb-data and said second comb-data as selected comb-data according to the detected vertical correlation;

horizontal band pass filter means for generating first chrominance signal data and second chrominance signal data by calculating differences between said selected comb-data and inversely delayed video signals and calculating differences between said inversely delayed video signals and reinversely delayed video signals, respectively, and for generating first horizontal correlation data and second horizontal correlation data by adding said selected comb-data to said inversely delayed video signals and said inversely delayed video signals to said reinversely delayed video signals, respectively, said inversely delayed video signals and said reinversely delayed video signals being generated by delaying said selected comb-data to invert and reinvert a phase of a chrominance subcarrier, respectively;

horizontal correlation adaptive means for comparing absolute values of said first horizontal correlation data and said second horizontal correlation data to detect horizontal correlation and for selectively providing one of said first chrominance signal data and said second chrominance signal data as selected chrominance signal data in response to the detected horizontal correlation; and luminance/chrominance signal output means for band-pass-filtering said selected chrominance signal data to output chrominance signals, and for calculating and providing differences between said selected chrominance signal data and video signals delayed by a predetermined time as luminance signals.

10. A correlation adaptive luminance and chrominance signal separating circuit as claimed in claim 9, wherein said horizontal band pass filter means comprises:

delay means for delaying said selected comb-data to invert said phase of said chrominance subcarrier to generate said inversely delayed video signals and for inversely delaying said inversely delayed video signals to generate said reinversely delayed video signals;

subtracter means for generating said first chrominance signal data and said second chrominance signal data by subtracting said selected comb-data from said inversely delayed video signals and by subtracting said reinversely delayed video signals from said inversely delayed video signals, respectively; and adder means for generating said first horizontal correlation data and said second horizontal correlation data by adding said selected comb-data to said inversely delayed video signals and by adding said reinversely delayed video signal to said inversely delayed video signals, respectively.

11. A correlation adaptive luminance and chrominance signal separating circuit as claimed in claim 9, wherein said horizontal correlation adaptive means comprises:

absolute value means for generating said absolute values of said first horizontal correlation data and said second horizontal correlation data supplied from said horizontal band pass filter means;

comparator means for comparing said absolute values of said first horizontal correlation data and said second horizontal correlation data to generate selecting data; and data selector means for providing one of said first chrominance signal data and said second chrominance signal data from said horizontal band pass filter means according to said selection data.

12. A correlation adaptive luminance and chrominance signal separating circuit as claimed in claim 11, wherein said horizontal band pass filter means further comprises half amplifier means for ½-amplifying said first chrominance signal data and said second chrominance signal data received by said data selector means.

13. The correlation adaptive luminance and chrominance signal separating circuit in claim 9, wherein said first comb-data and said second-comb data represent differences between said input video signals and said 1H delayed video signals and differences between said 1H delayed video signals and said 2H delayed video signals, respectively.

14. The correlation adaptive luminance and chrominance signal separating circuit in claim 9, wherein said input video signal is a digital video signal.

15. The correlation adaptive luminance and chrominance signal separating circuit in claim 14, wherein said input video signal has a sampling frequency of four times the frequency of said chrominance subcarrier.

16. The correlation adaptive luminance and chrominance signal separating circuit in claim 15, wherein said inversely delayed video signals and said reinversely delayed video signals are generated by delaying said selected comb-data two clock periods and four clock periods, respectively.

17. The correlation adaptive luminance and chrominance signal separating circuit in claim 9, wherein said delayed video signals delayed by said predetermined time are said 1H delayed video signals.

* * * * *

UNITED STATES PATENT AND TRADEMARK OFFICE
CERTIFICATE OF CORRECTION

PATENT NO. : 5,225,899
DATED : 6 July 1993
INVENTOR(S) : Young-jun Park

It is certified that error appears in the above-indentified patent and that said Letters Patent is hereby corrected as shown below:

Column 1,

Line 11,     change "correlation" to --correlations--;

Line 16,     after "human eye", insert --cannot--;

Column 2

Lines 38-39,     change "outputted" to --output--;

Column 3,

Line 21,     change "inputted" to --input--;

Column 5,

Line 15,     change "certical" to --vertical--;

Column 6,

Line 14,     change "comprises" to --includes--;

UNITED STATES PATENT AND TRADEMARK OFFICE
CERTIFICATE OF CORRECTION

PATENT NO. : 5,225,899
DATED : 6 July 1993
INVENTOR(S) : Young-jun Park

It is certified that error appears in the above-indentified patent and that said Letters Patent is hereby corrected as shown below:

Column 7,

Line 36,     change "inputted" to --input--;

Column 8,

Line 37,     replace "selection data of" with --selector 194, and in other--;

Line 38,     delete "the logic "o" is ";

Column 9,

Line 1,     change "outputted" to --output--;

Signed and Sealed this

Sixteenth Day of August, 1994

Attest:

BRUCE LEHMAN

*Attesting Officer*      *Commissioner of Patents and Trademarks*